Oct. 14, 1958   J. T. NOLAND, JR., ET AL   2,855,740
MACHINE FOR LOADING ARTICLES INTO CARTONS
Filed Dec. 7, 1956   3 Sheets-Sheet 2
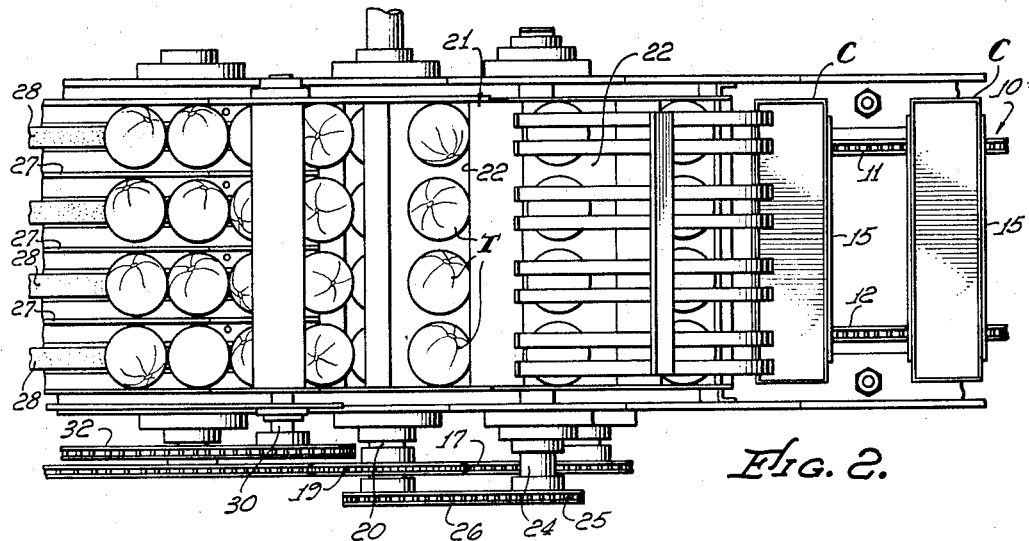
Fig. 2.
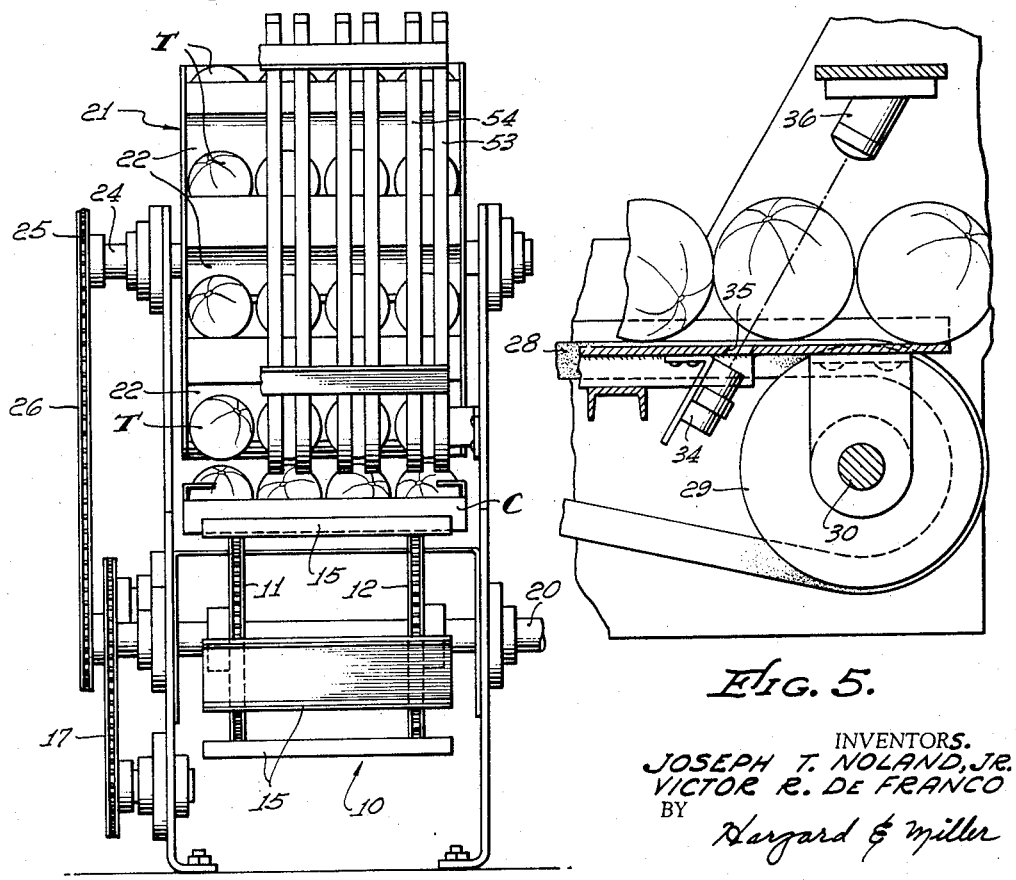
Fig. 3.
Fig. 5.
INVENTORS.
JOSEPH T. NOLAND, JR.
VICTOR R. DE FRANCO
BY
Hazzard & Miller
ATTORNEYS.

United States Patent Office 2,855,740
Patented Oct. 14, 1958

2,855,740

MACHINE FOR LOADING ARTICLES INTO CARTONS

Joseph T. Noland, Jr., Whittier, and Victor R. De Franco, Inglewood, Calif., assignors to New England Tomato Company, Los Angeles, Calif., a corporation of California Application December 7, 1956, Serial No. 626,889

3 Claims. (Cl. 53—250)

This invention relates to a machine for loading articles into cartons.

Explanatory of the present invention, it has heretofore been proposed to market such articles of produce as tomatoes by positioning four tomatoes in a cardboard carton. After these cartons have been filled with tomatoes the top of the carton is then covered over the contained tomatoes with a sheet of transparent material such as cellophane. The packaging of tomatoes in this manner not only makes it convenient for the purchaser to purchase a group of four tomatoes, but assists in protecting the tomatoes while they are being displayed for purposes of sale. Heretofore, in packaging tomatoes in this manner the tomatoes have been positioned in the cartons manually with the result that the labor expense involved in packaging the tomatoes is of considerable magnitude.

An object of the present invention is to provide a machine for loading tomatoes into cartons so as to eliminate to a large extent the labor costs involved in filling the cartons. While tomatoes may be sized, that is selected and handled in groups of definite minimum and maximum sizes, tomatoes generally are not perfectly spheroidal and consequently will not roll smoothly in feed chutes or the equivalent. The irregularity of the tomatoes is sufficient to cause the tomatoes to turn or roll to one side of a chute or another. This peculiarity of tomatoes is not restricted thereto but is true also of other articles of produce such as for example citrus fruits which may be packaged in a similar manner.

It is another object of the present invention to provide a machine which is so designed as to handle spheroidal but nevertheless irregularly-shaped articles and which will deposit such articles in cartons without danger of crushing the articles or depositing more or less than a selected number of the articles in the cartons.

Another object of the invention is to provide a machine having the above-mentioned characteristics in which there is a rotary loading wheel which transfers by means of pockets in the periphery thereof, the articles from feed chutes to the cartons which are transported through a loading station on an endless conveyor and to provide a novel guard means adjacent the loading wheel which will tend to keep the articles in proper positions in the pockets so that they will be properly transferred therefrom into the cartons.

Another object of the invention is to provide a loading wheel in which there are pockets equipped with transverse bars extending thereacross which prevent more than a desired number of articles to enter the pockets from the loading chutes.

Still another object of the invention is to provide a feed means in a machine of this character consisting essentially of a plurality of chutes, each of which is designed to contain a row of the articles that are to be loaded in the cartons. Each chute has in the bottom thereof an endless feed conveyor and means is provided for stopping the entire machine and the feed conveyors in the event that one chute becomes empty of articles or there is no article therein adjacent the loading wheel. The feed conveyor in that chute which has become emptied or which does not have an article therein adjacent the loading wheel is kept in operation so as to advance articles that may be near the entrance to the chute. As soon as the chute has become re-filled with articles adjacent the loading wheel operation of the entire machine is automatically resumed. In this manner, danger of loading cartons with less than its complete quota is avoided.

With the foregoing and other objects in view, which will be made manifest in the following detailed description and specifically pointed out in the appended claims, reference is had to the accompanying drawings for an illustrative embodiment of the invention, wherein:

Fig. 2 is a top plan view of a portion of the machine shown in Fig. 1, and may be regarded as having been taken upon the line 2—2 upon Fig. 1;

Fig. 3 is an end view in elevation of the machine and may be regarded as having been taken upon the line 3—3 upon Fig. 1;

Fig. 5 is a sectional view taken substantially upon the line 5—5 upon Fig. 4.

Figure 1:
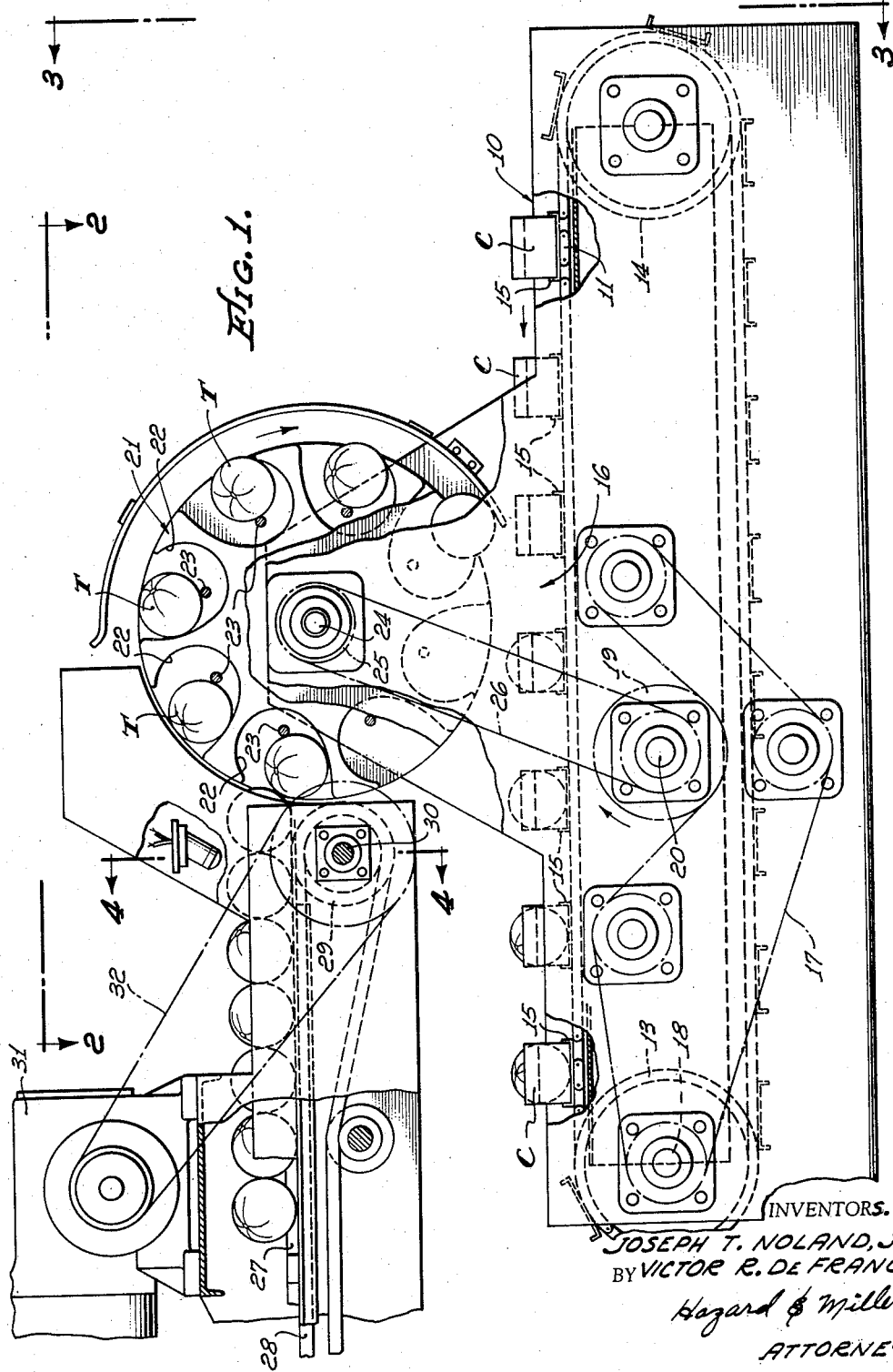
Figure 1 is a view in side elevation of the carton loading machine embodying the present invention.

Referring to the accompanying drawings wherein similar reference characters designate similar parts throughout, the improved carton loading machine comprises an endless conveyor generally indicated at 10 consisting of spaced endless chains 11 and 12 trained over sprockets or the equivalent indicated at 13 and 14. The chains 11 and 12 are connected at equally spaced intervals by carton holders 15 on which open cardboard cartons or the equivalent, indicated at C, may be positioned so as to be carried by the conveyor sequentially or one behind the other through the locality of a loading station which locality is indicated at 16. The sprockets 13 and 14 are arranged on transverse shafts and the sprocket 13 is forcibly driven by an endless chain indicated at 17 which is trained over a sprocket on the end of the shaft 18 on which the sprockets 13 are mounted. The endless chain 17 is trained over various idler sprockets and over a sprocket 19 on a transverse shaft 20 driven by a suitable power source, not shown. The shaft 20 is driven smoothly and continuously so that the endless conveyor is caused to move smoothly and continuously and carry the carton C smoothly and continuously through the loading station 16.

Above the loading station 16 there is a rotary loading wheel indicated at 21. This loading wheel has transversely extending pockets 22 formed in its periphery and bars 23 extend across these pockets to properly position therein the tomatoes or other articles of produce which are indicated at T. The rotary loading wheel 21 is mounted on a transverse shaft 24 on which there is a sprocket 25 and an endless chain 26 drives this shaft off of the power-driven shaft 20. The ratio of the sprockets is such that the peripheral speed of the loading wheel 21 is equal to the linear speed of the endless conveyor 10 and the spacing of the pockets 22 in the loading wheel is equal to the spacing between the carton carriers 15. In this manner, as the loading wheel is driven in timed relation to the endless conveyor 10 each time that a carton C is in the loading station 16 one pocket 22 will be in position to discharge its tomatoes T therein.

Figure 4:
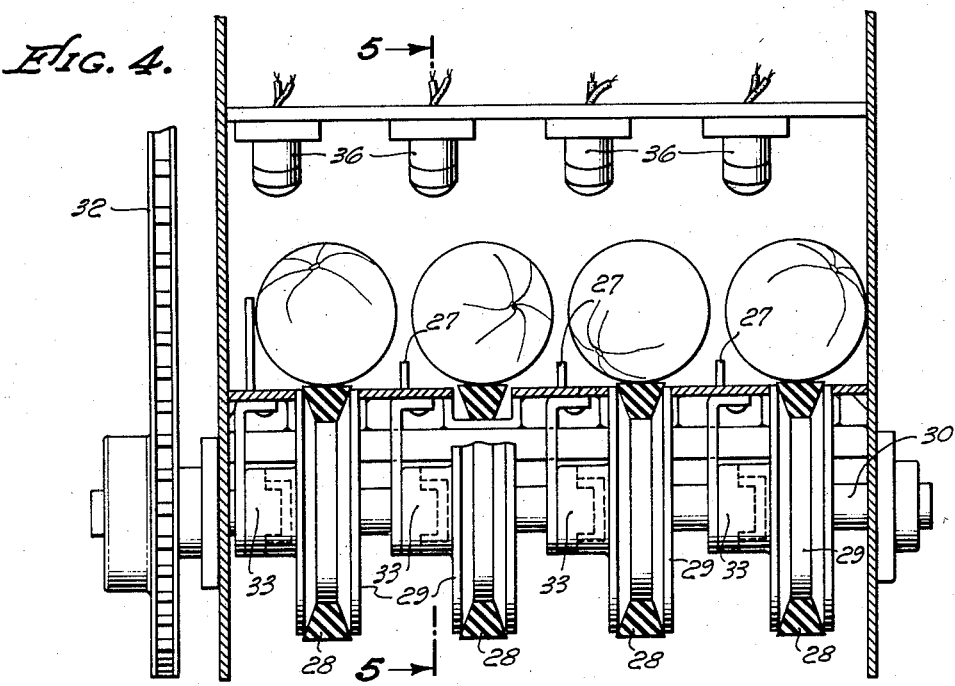
Fig. 4 is a sectional view taken substantially upon the line 4—4 upon Fig. 1.

The loading wheel receives its tomatoes T from feed chutes which, as illustrated in Fig. 4, are four in number and are defined from each other by short upstanding partitions 27. In the bottom of each chute adjacent the center thereof there is an endless feed conveyor, the endless feed conveyors being indicated at 28. These are in the form of V-belts trained over V-pulleys 29 on a transversely extending shaft 30 which is driven by an electric motor 31 and a chain 32. Each V-pulley 29 has associated therewith a magnetic clutch 33 which, when the clutch is engaged, establishes a driving connection between the pulley and the shaft 30. Any magnetic clutch when disengaged will disconnect its V-pulley 29 from the shaft 30, thus stopping operation of its feed belt or conveyor 28. The feed chutes all lead toward the side of the loading wheel 21 and adjacent the loading wheel each feed chute has on the underside thereof a light source 34 that is directed upwardly through an opening 35 in the bottom of the feed chute toward a delayed-action light-responsive electric switch 36. The path of light between the light source 34 and the switch 36 is such as to be intercepted by tomatoes T which are passing along the feed chutes toward the loading wheel. The delayed-action, light-responsive switch 36 for chute No. 1 controls two contactors 37 and 38 mechanically connected together as indicated at 39 so that when contactor 37 is in closed circuit position contactor 38 is in open position. However, when contactor 37 is in open position as a result of the actuation of the light-responsive switch 36, contactor 38 will be thrown into closed position. In a similar manner, chute No. 2 has its light-responsive switch 36 controlling contactors 40 and 41 which are similarly mechanically connected together. The light-responsive switches 36 for chutes Nos. 3 and 4 control contactors 42 and 43 and 44 and 45, respectively. The contacts engageable by contactors 38 and 41, 43 and 45 are connected to their responsive magnetic clutches 33 as indicated on Fig. 6. The contacts which are engaged by contactors 37, 40, 42, and 44 are connected together in series through their respective contacts and to a relay 46. Relay 46 has mechanically connected contactors 47, 48, 49, and 50 which are engageable with contacts in circuit with the power source and with the magnetic clutches 33 of their respective chutes. In addition to these contactors relay 46 has a contactor 51 engageable with contacts connected to the power source and to a relay 52. Relay 52 controls the circuit through the electric motor which rotates shaft 20.

Figure 6:
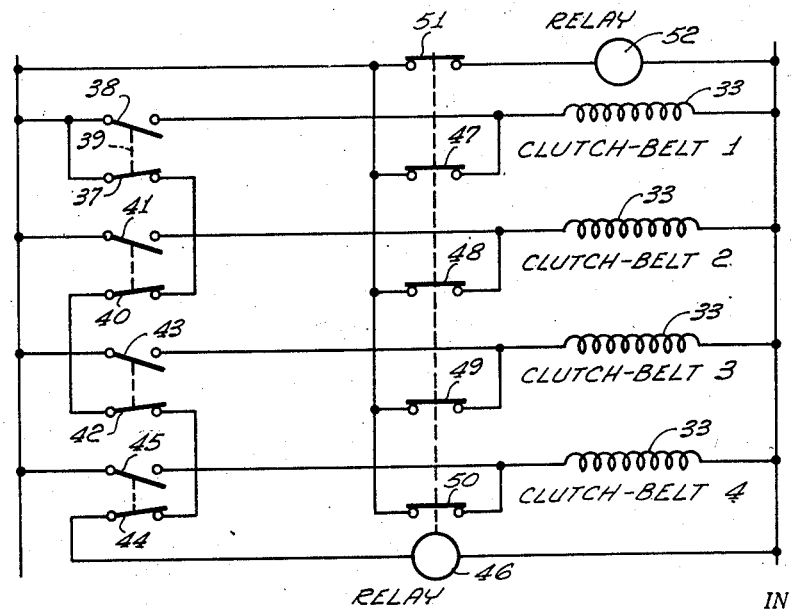
Fig. 6 is a wiring diagram.

In normal operation, shaft 30 is being continuously driven and the contactors shown on Fig. 6 are in the position shown with contactors 37, 40, 42, 44, 47, 48, 49, 50 and 51 closed and contactors 38, 41, 43, and 45 open. In the event for example that no tomatoes were in chute No. 1 or this chute were emptied to such an extent that there were no tomatoes about to be carried therefrom into the next succeeding pocket on the loading wheel, switch 36 causes contractor 37 to open and contactor 38 to close. The opening of contactor 37 breaks the circuit through contactors 40, 42, and 44 to relay 46 causing contactors 47, 48, 49, 50, and 51 to be opened thereby. This breaks the circuit to relay 52 controlling the power supplied to shaft 20, thus stopping the operation of the conveyor 10 and of the loading wheel 21. The opening of contactors 47, 48, 49 and 50 breaks the circuits therethrough to their respective magnetic clutches 33. However, when contactor 37 opens, contactor 38 is simultaneously closed, thus establishing a second circuit through the magnetic clutch for chute No. 1 only. Consequently, when chute No. 1 has been emptied of tomatoes the entire machine is shut down automatically with the exception of the feed conveyor in chute No. 1 which continues to advance toward the loading wheel. When chute No. 1 has been re-filled with tomatoes the breaking of the light beam between light source 34 and light switch 36 causes contactors 37 and 38 to return to the position shown on Fig. 6, thus closing the circuit through relay 46 and causing contactors 47 to 51, inclusive, to close. Operations are consequently resumed.

The same sequence of operation will happen if any other chute besides No. 1 chute becomes emptied of tomatoes.

It will of course be appreciated that the spaces between adjacent tomatoes passing along a chute will permit momentary passage of light from the light source 33 to the light switch 36. By reason of the delayed action of the light switch 36 these momentary beams of light that are transmitted to the light switch do not involve an immediate throwing of its respective contactor 37, 40, 42, or 44 as the case may be. It is only when light from the light source reaches the light switch 36 over a longer period of time than a mere momentary beam that the contactors are thrown. Because of the delayed action of the light switch 36 it is advisable to have the light source 34 arranged a short distance from the loading wheel preferably a distance greater than the diameter of the average tomato as depicted in Fig. 5.

When the tomatoes pass from the feed chutes into their respective pockets 22 on the loading wheel the presence of the bars 23 prevents more than one tomato from each chute entering each pocket. The position of the bar may be adjusted in handling tomatoes of different sizes. Its presence, however, is desirable in that it prevents two tomatoes from the same chute entering each pocket. The position of the bar may be adjusted in handling tomatoes of different sizes. Its presence, however, is desirable in that it prevents two tomatoes from the same chute attempting to enter the same pocket.

When a pocket 22 has been loaded with a tomato from each chute the tomatoes therein are carried by the rotary loading wheel 21 over the top of the wheel and on descending toward the loading station 16 they may tend to roll out of the pockets. To prevent this a guard means is arranged closely adjacent the periphery of the loading wheel. This guard means consists of a pair of spaced parallel strips 53 and 54 for each tomato in each pocket. The use of spaced parallel strips provides spaced edges or surfaces between which a tomato will tend to enter. Consequently, these guards tend to keep the tomatoes centered with respect to their positions that they acquired in the pockets on being deposited therein from the feed chutes. Consequently, as the tomatoes spill or fall from their respective pockets into the carton C at the loading stations they will not tend to roll laterally due to their irregular shape but will drop smoothly and easily into the cartons in proper position therein.

After the cartons have been filled they are carried by the conveyor 10 to the end thereof where the cartons can be manually removed and the cellophane covers applied thereto.

From the above-described construction it will be appreciated that the improved carton-loading machine is highly advantageous in that it is largely automatic in its operation and provision is made to assure that each carton will receive its full quota of tomatoes or the machine will be automatically stopped in its operation until an empty feed chute or feed chutes are re-filled to assure that this will take place. The improved machine enables a multiplicity of cartons to be easily and quickly filled with a minimum of labor cost and while the machine has been primarily designed for loading tomatoes in cartons, it may be used for loading other articles of produce in cartons, particularly articles which are of such irregular spheriodal shape that they will not readily roll.

Various changes may be made in the details of construction without departing from the spirit and scope of the invention as defined by the appended claims.

We claim:

1. A carton loading machine comprising conveyor means for conveying cartons sequentially through a loading station, a pocketed loading wheel rotatable over the loading station, means for feeding rows of articles to be loaded into the cartons toward the loading wheel to be received in the pockets thereof and carried thereby to the loading station, bars extending across the pockets of the loading wheel limiting the filling of each pocket to one article from each row, and means for rotating the loading wheel and driving the conveyor means so that the loading wheel will have the same peripheral speed as the linear speed of the conveyor means.

2. A carton loading machine comprising conveyor means for conveying cartons sequentially through a loading station, a pocketed loading wheel rotatable over the loading station, means for feeding rows of articles to be loaded into the cartons toward the loading wheel to be received in the pockets thereof and carried thereby to the loading station, means for rotating the loading wheel and driving the conveyor means at speeds such that the peripheral speed of the loading wheel and the linear speed of the conveyor means shall be equal, and means operable by the absence of an article in a row of the feeding means for stopping rotation of the loading wheel and the driving of the conveyor means.

3. In a carton loading machine, a rotary loading wheel having pockets in the periphery thereof, a plurality of chutes leading toward the loading wheel, a feed conveyor in each chute, means for rotating the loading wheels, and means operable by the absence of an article in a chute adjacent the loading wheel for discontinuing rotation of the loading wheel and operation of the feed conveyors in all other chutes but to continue operation of the feed conveyor in the chute in which the article is absent.

References Cited in the file of this patent

UNITED STATES PATENTS

| 2,318,927 | Davis | May 11, 1943 |
| 2,792,922 | Malhiot | May 21, 1957 |